(12) United States Patent
Lovell et al.

(10) Patent No.: US 9,143,290 B2
(45) Date of Patent: Sep. 22, 2015

(54) RECEIVER AND METHOD OF RECEIVING AND TRANSMITTER AND METHOD OF TRANSMITTING FOR OFDM SYMBOLS

(71) Applicant: Sony Corporation, Minato-ku (JP)

(72) Inventors: Martin Lovell, Reading (GB); Lothar Stadelmeier, Stuttgart (DE)

(73) Assignee: Sony Corporation, Tokyo (JP)

( * ) Notice: Subject to any disclaimer, the term of this patent is extended or adjusted under 35 U.S.C. 154(b) by 114 days.

(21) Appl. No.: 14/052,858

(22) Filed: Oct. 14, 2013

(65) Prior Publication Data

US 2014/0146758 A1 May 29, 2014

(30) Foreign Application Priority Data

Nov. 28, 2012 (GB) .................................. 1221441.7

(51) Int. Cl.
*H04J 3/08* (2006.01)
*H04L 5/00* (2006.01)
*H04L 27/26* (2006.01)

(52) U.S. Cl.
CPC ............ *H04L 5/0007* (2013.01); *H04L 5/0046* (2013.01); *H04L 5/0091* (2013.01); *H04L 27/2602* (2013.01)

(58) Field of Classification Search
None
See application file for complete search history.

(56) References Cited

U.S. PATENT DOCUMENTS

| 7,295,518 | B1 | 11/2007 | Monk et al. | |
|---|---|---|---|---|
| 2011/0185263 | A1* | 7/2011 | Chapman et al. | 714/776 |
| 2013/0236177 | A1* | 9/2013 | Fang et al. | 398/66 |

FOREIGN PATENT DOCUMENTS

| JP | 2012-217099 | 11/2012 |
|---|---|---|
| WO | WO 02/058391 A2 | 7/2002 |

OTHER PUBLICATIONS

United Kingdom Search Report issued Mar. 27, 2013 in GB 1221441.7, filed on Nov. 28, 2012.
Data Over Cable Service Interface Specifications DOCSIS® 3.0, Physical Layer Specification, CM-SP-PHYv3.0-I10-111117 171 pages.
Data-Over-Cable Service Interface Specifications DOCSIS 3.0, MAC and Upper Layer Protocols Interface Specification, CM-SP-MULPIv3.0-I20-121113, 760 pages.

* cited by examiner

*Primary Examiner* — Kouroush Mohebbi
(74) *Attorney, Agent, or Firm* — Oblon, McClelland, Maier & Neustadt, L.L.P.

(57) ABSTRACT

A receiver receives payload data transmitted on a downstream using Orthogonal Frequency Division Multiplexed (OFDM) symbols via a cable network. The receiver includes circuitry configured to receive a downstream signal representing the payload data modulated onto one or more OFDM symbols, and to demodulate the OFDM symbols of each frame to detect and to recover the payload data using the physical layer signalling data. One or more of the frames of the received signal includes a preamble of the frame providing the physical layer signalling data, and in a separate media access control (MAC) signal within the frame, upstream messages relating to the transmission of data from the receiver to the transmitter. Accordingly, an arrangement is provided for a cable network communications system in which a capacity for upstream signalling messages for communicating on the downstream can be adapted to a requirement of receivers connected to the network.

20 Claims, 10 Drawing Sheets

RECEIVER AND METHOD OF RECEIVING AND TRANSMITTER AND METHOD OF TRANSMITTING FOR OFDM SYMBOLS

CROSS REFERENCE TO RELATED APPLICATIONS

The present application claims priority to United Kingdom Application 1221441.7 filed on 28 Nov. 2012 the contents of which being incorporated herein by reference in its entirety.

FIELD OF THE INVENTION

The present disclosure relates to transmitters for transmitting data to receivers via a cable network and for receivers for receiving data from a cable network.

BACKGROUND OF THE INVENTION

There are various media via which data can be communicated including terrestrial and satellite radio frequency signals for both broadcast systems and cellular mobile communication systems where mobile terminals communicate using radio signals to a network of base stations. Another media for communicating data is a cable network which can be a coaxial cable or a fibre optic in which data is modulated and communicated through the cable. Cable systems can be used to form broadcast systems in which a Cable Modem Termination System (CMTS) or head end modulates data onto signals for transmission through the cable network to a receiver which is known as a Cable Modem (CM). An example of a cable modem system which has been developed for the communicating data including television signals via a cable network is the Data Over Cable Service Interface Specifications (DOCSIS) system which is administered by the cable labs. DOCSIS 3.0 for example provides a physical layer and a media access layer specification for arranging for data to be communicated via a cable network. The specification provides various communication techniques between the CMTS and the CMs for efficiently using an available bandwidth within the cable network.

There are various applications for the communications of the data via a cable network. These applications increase in variety and include video transmission, voice transmission, gaming and data communications generally. In order to allow access of the CMs to the upstream communications resources it is necessary to provide an arrangement of the cable network system to the effect that the CMs can request access to upstream communications resources for communicating data from the CM to the CMTS.

It will therefore be appreciated that with respect to known cable network communication systems it is desirable to provide an improved cable network communications system which makes an efficient use of communications resources by reducing signalling overheads and optimises a round trip delay time for accessing upstream communications resources.

SUMMARY OF INVENTION

According to an aspect of the present technique there is provided a receiver for receiving payload data transmitted on a downstream using Orthogonal Frequency Division Multiplexed (OFDM) symbols via a cable network. The receiver comprises a signal receiving section configured to receive a downstream signal representing the payload data modulated onto one or more OFDM symbols. The downstream signal comprising one or more data profiles transmitted in scheduling intervals, each of the one or more data profiles providing the payload data according to a different receiver profile and being carried by different downstream communications resources of the OFDM symbols within the scheduling intervals. The downstream signal also includes physical layer signalling data identifying the downstream communications resources of the data profiles in each of the scheduling intervals. A demodulator is configured to demodulate the OFDM symbols of one of the data profiles to detect and to recover the payload data using the physical layer signalling data. The physical layer signalling data is received as a preamble of one of the scheduling intervals, and the signal receiving section and the demodulator receive one or more of the scheduling intervals, which include in separate communications resources of the downstream signal a media access control (MAC) signal representing upstream messages relating to the transmission of data from the receiver to the transmitter.

According to some examples, a transmitter forms a cable modem termination system or head-end of a cable network and the receiver may comprise a cable modem for communicating payload data in a form of data packets such as internet protocol packets via a cable network.

According to another aspect of the present technique there is provided a receiver for receiving payload data transmitted on a downstream using Orthogonal Frequency Division Multiplexed (OFDM) symbols via a cable network. The receiver comprises a signal receiving section configured to receive a downstream signal representing the payload data modulated onto one or more OFDM symbols, the downstream signal comprising one or more data profiles transmitted in scheduling intervals, each of the one or more data profiles providing the payload data according to a different receiver profile and being carried by different downstream communications resources of the OFDM symbols within the scheduling intervals. A demodulator is configured to demodulate the OFDM symbols of one of the data profiles to detect and to recover encoded payload data from the communications resources of the OFDM symbols. An error correction decoder is configured to recover an estimate of the payload data from the recovered encoded data. The payload data is transmitted as a plurality of data blocks, each of the data blocks being encoded as a forward error correction, FEC, packet, each of the FEC packets being received from the communications resources of the OFDM symbols allocated to the data profile, and the error correction decoder is configured to recover the payload data from the FEC packets.

According to some embodiments, each of the data profiles providing the encoded payload data is transmitted with an FEC header identifying at least one of an identifier of the profile, a number of FEC packets in the profile and a length of the last packet. The receiver is configured to detect and to recover one or both of the identifier of the profile, the number of FEC packets and the last FEC packet length in the profile and to control the error correction decoder to recover the payload data using the identifier of the profile and the number of FEC packets in the data profile.

Various further aspects and features of the invention are defined in the appended claims and include transmitters and receivers and transmitting and receiving methods.

BRIEF DESCRIPTION OF THE DRAWINGS

Embodiments of the present invention will now be described by way of example only with reference to the accompanying drawings in which like parts contain the same numerical references and in which.

DESCRIPTION OF EXAMPLE EMBODIMENTS

According to example embodiments the downstream signal comprises scheduling intervals, each of which includes the payload data formed into one or more data profiles and infrequent preamble symbols comprising the physical layer signalling.

Accordingly, an arrangement is provided for a cable network communications system in which a capacity for MAC signalling messages for communicating on the downstream and relating to a grant of upstream communications resources can be adapted to a requirement of receivers connected to the network because the MAC signals on the downstream are decoupled from the communication of the preamble providing physical layer signalling.

It will be appreciated from the following description that a scheduling interval is a period of time or quasi-transmission frame in which each of the data profiles may be allocated downstream communications resources for transmission, but may not include all of the data profiles.

With an increase in the applications and uses of a cable network system it is becoming increasing important to reduce a round trip delay time that is the time for a CM to request and receive grant of communications resources for transmitting on the upstream to the CMTS. Embodiments of the present technique can provide an arrangement in which a downstream scheduling interval for transmitting payload data to receivers includes one or more different temporal segments in which payload data is transmitted to receivers according to different profiles. The payload data is transmitted according to each profile using different transmission parameters, such as for example, a modulation scheme, encoding rate or transmission power in accordance with a profile of the receivers which are to receive the payload data. In this respect embodiments of the present disclosure are arranged to transmit the payload data in accordance with a relative environment for receiving the transmitted payload data. As such, receivers can be broadly divided into different groups of receivers according to their relative ability to receive the transmitted payload data. This may be as a result of a capability of the receiver or an environment in which the receiver is receiving the transmitted payload data. For example, receivers which are connected to a cable network relatively close to the transmitter may have a relatively benign reception environment providing a high signal to noise ratio so that a highly spectrally efficient modulation scheme can be used, whereas a receiver which is connected to a cable network a relatively long distance from the transmitter may experience a more difficult reception environment causing a relatively low signal to noise ratio. Where the reception environment is more difficult, a more robust but less spectrally efficient modulation scheme may be used, and/or a lower encoding rate for error correction providing greater redundancy. Thus the receivers may be grouped according to their capability to detect and recover the payload data from the transmitted signals and the grouping matched to a predetermined profile of transmission parameters.

According to some embodiments a preamble is provided at periodic but infrequent time intervals providing one or more temporally separated profiles within the scheduling interval. The preamble provides an indication of a location in respect of a temporal position of the one or more data profiles in the following scheduling interval. The present technique provides a temporal segment or burst of transmitted OFDM symbol or symbols periodically which are modulated with upstream related signalling messages are referred to as upstream signalling. The upstream signalling messages may form part of a media access control layer for requesting and granting access to upstream communications resources. Thus according to the present technique a section of one scheduling interval may include a part for conveying upstream messages for transmission from the transmitter to one or more of the receivers, the upstream messages may be interleaved with the data profiles. A capacity allocated to the upstream signalling messages may be decoupled from the preamble signalling which may provide layer one information.

Embodiments of the present technique can be arranged to form a transmission network for transmitting payload data to receivers which may communicate for example internet protocol packets to the receiving apparatus. The receiving apparatus may include or form part of a cable modem. In some examples the transmitter and receivers form part of a cable network operating, for example, in accordance with a DOCSIS standard.

Figure 1:
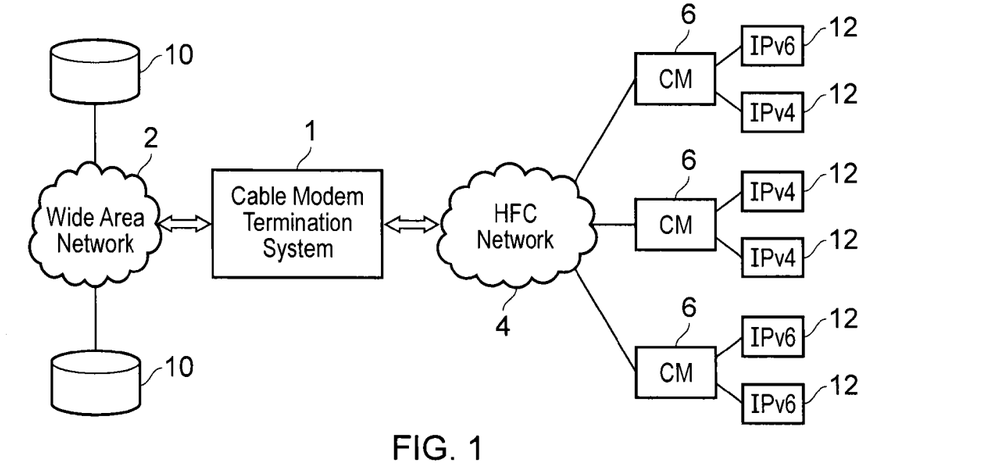
FIG. 1 is a schematic block diagram of a cable network illustrating one example of the present technique.

An example of a cable modem system is shown in FIG. 1. In FIG. 1, a cable modem termination system (CMTS) or head end 1 is connected to a wide area network 2. The wide area network can provide a communications medium through which data can be accessed from sources for transmission by the CMTS via a hybrid fibre-coax network 4 to cable modems (CM) 6. One or more servers 10 may be connected to the wide area network 2 for communicating data to the CMTS 1 for transmission via the hybrid fibre-coax network 4 to the CMs 6. The CMs 6 are connected to devices 12 for receiving the data transmissions which may operate in a transport layer using an internet protocol such as IPV4 or IPV6. The devices 12 may be user devices such as televisions, personal computers or any other devices for receiving user data via a CM.

FIG. 1 illustrates an example cable network in which the hybrid fibre-coax network 4 is formed from a combination of coaxial cable and fibre optic and therefore can be referred to as a hybrid fibre coax (HFC) network. The hybrid fibre-coax network 4 is therefore used to provide a transmission medium for transmitting data to and from the CMs 6 from and to the CMTS 1 which forms a head-end of the cable network system. A simplified illustration of components for communicating data in accordance with the present technique is illustrated in FIG. 2.

Figure 2:
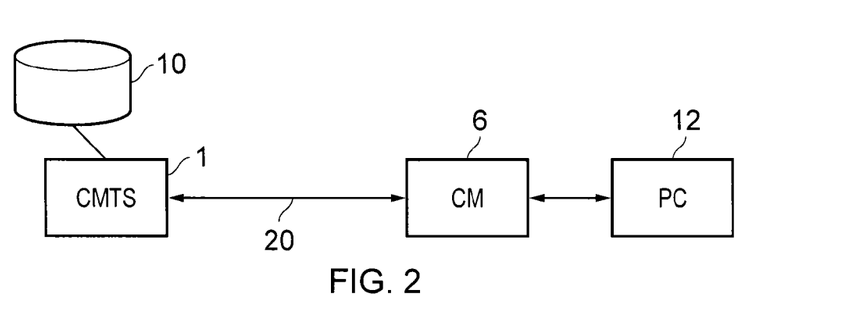
FIG. 2 is a more simplified view of a communication between a cable modem termination system (CMTS) and the cable modem (CM) within the network shown in FIG. 1.

In FIG. 2 the CMTS 1 is shown to be connected to the CM 6 via a link 20 which is formed by the HFC network. A personal computer (PC) 12 is connected to the cable modem 6 although it will be appreciated that various user devices could be connected to the CM 6 for transmitting and receiving data. Similarly, the server 10 is connected to the CMTS 1 for delivering services including broadcast data such as video streaming for transmission over the cable network to the PC 12.

The present technique can find application in communications systems such as cable networks in which data is transmitted and received, for example, in accordance with a DOCSIS standard. DOCSIS standards are administered by CableLabs, which releases agreed specifications for each version of the standard. For example DOCSIS 3.0 provides a physical layer specification in document CM-SP-PHYV3.0-I10-11117 and a media access layer specification in a document CM-SP-MULPIV3.0-I20-121113. The DOCSIS specifications therefore provide a media access layer and a physical layer in addition to other related specifications for communicating data over a cable network such as those illustrated in FIGS. 1 and 2.

Figure 3:
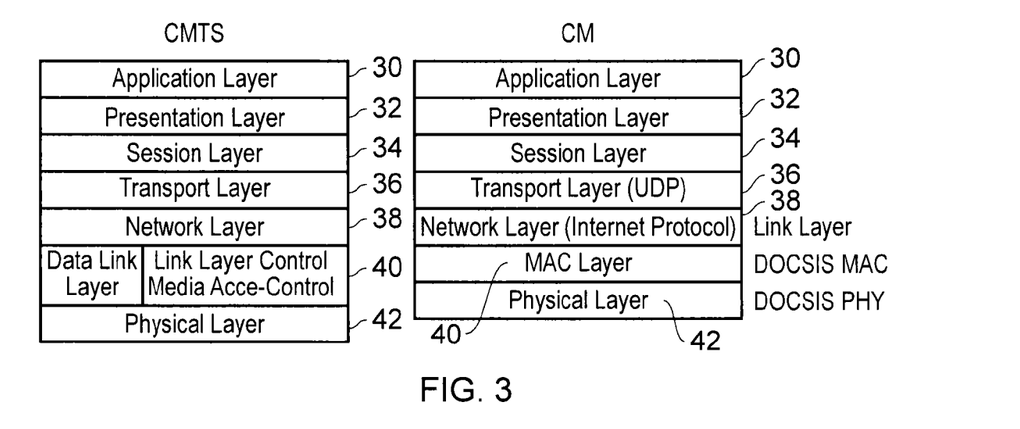
FIG. 3 provides an illustrative representation of a protocol stack of the CMTS and CM operating in one example in the systems shown in FIGS. 1 and 2.

In the following description of example embodiments the term scheduling interval will be used to refer to a period in which a transmission of data for each of the data profiles is available in a round-robin arrangement, but for which data may not be transmitted for all data profiles. A protocol stack illustrating various layers in an OSI model for the CMTS and the CM is shown in FIG. 3. As shown in FIG. 3, the protocol stack includes an application layer 30 a presentation layer 32, a session layer 34 a transport layer 36 and a network layer 38. The network layer 38 could be formed by an internet protocol and provides a link layer in the cable network between the CMTS and the CM. A media access control layer 40 which, for example, may be specified as a DOCSIS MAC layer communicates data from the network layer to the physical layer 42 which may be specified in accordance with a DOCSIS physical layer 42. The arrangement of the protocol stack is provided in order to transmit and receive data via the cable network so that application layer programmes operating on a PC for example can receive data from the server 10. Of particular relevance to the technique provided in the present disclosure is the MAC layer 40 and the physical layer 42. An example of a physical layer 42 will now be explained.

Figure 4:
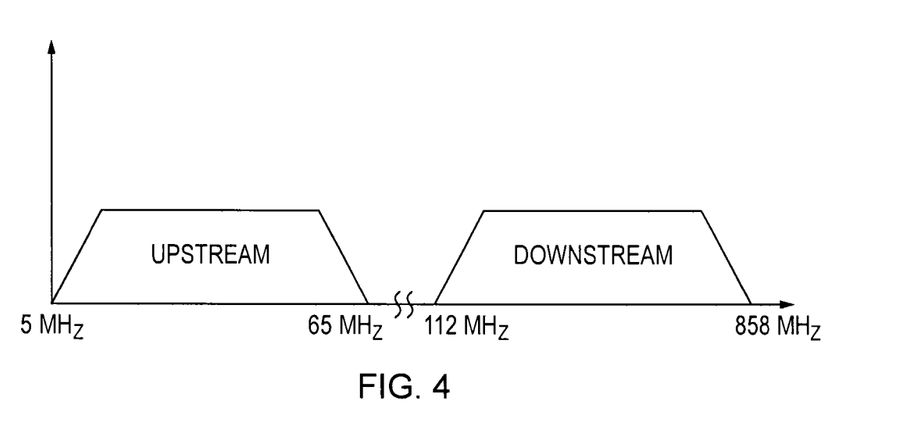
FIG. 4 is a graphical representation illustrating frequency bands for upstream and downstream communication of a cable network system.

FIG. 4 provides an illustrative representation showing the upstream and downstream frequency bands of an example system. As shown in FIG. 4 the upstream frequency band is shown between 5 and 65 MHz whereas the downstream frequency band is much larger between 112 and 858 MHz. The arrangement shown in FIG. 4 corresponds substantially to the Euro DOCSIS 3.0 standard although it will be appreciated that these frequency ranges are just examples and other upstream and downstream frequencies and the location of the bands can be different in other example embodiments.

Figure 5:
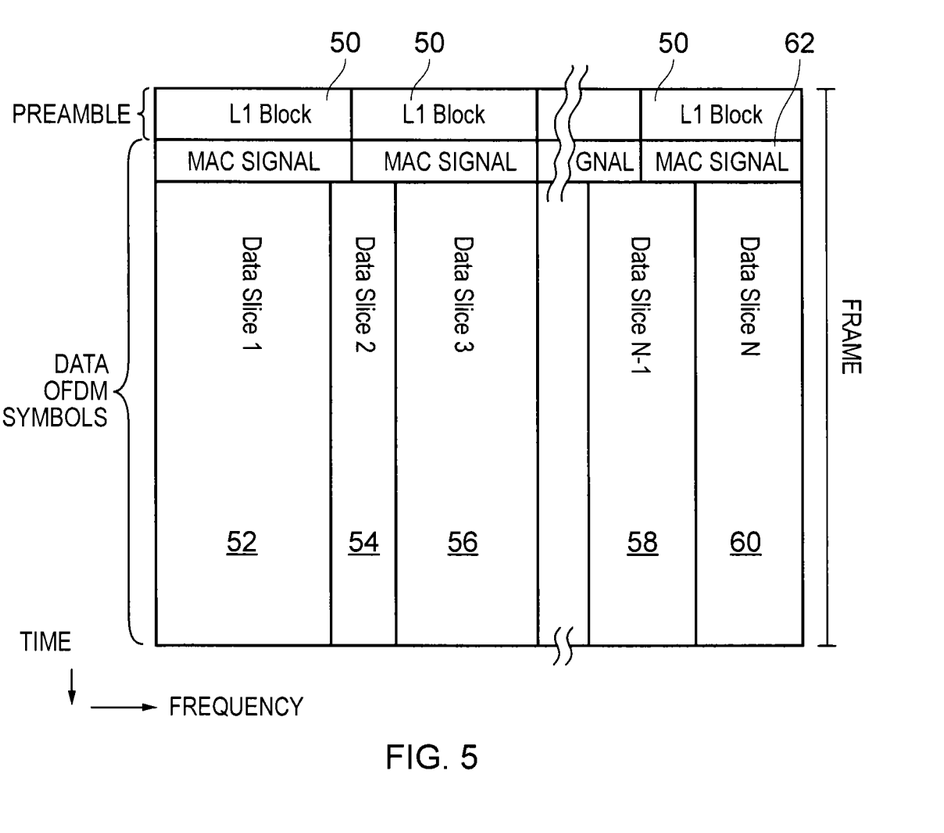
FIG. 5 is an illustrative representation showing a make-up of downstream communication scheduling interval using orthogonal frequency division modulation (OFDM)

In an example implementation of a physical layer for a cable network system Orthogonal Frequency Division Multiplexing (OFDM) can be used to provide bandwidth efficient communication of data on both the upstream and the downstream of a cable network system. An example of a downstream structure for communicating data is shown in FIG. 5 which corresponds substantially to an arrangement disclosed in the DVB-C2 standard. As shown in FIG. 5, a frame structure is presented in a graphical form with frequency on the x-axis and time on the y-axis time, with time going down from the top to the bottom of the page. In FIG. 5, a first part of the frame provides in a preamble to the scheduling interval layer one (L1) data in a L1 blocks 50. Each of the L1 blocks includes the same information describing the position and location of the data bearing slices 52, 54, 56, 58 and 60. According to the arrangements shown in FIG. 5 and consistent with the DVB-C2 standard, the data slices conveying data for each of a different number of channels have a different bandwidth which varies within a predetermined maximum bandwidth which is a useful bandwidth of the receiver. Thus, within the available bandwidth of the channel, a width of each of the data slices may vary so that some services may be provided with more bandwidth than others. Thus, the layer one (L1) signalling blocks 50 provide layer one data describing the position and location of each of the data slices.

Also shown in FIG. 5, a second upstream signalling burst or block 62 appears just after the L1 block 50, although it will be appreciated from the explanation below that the upstream signalling burst 62 could appear at any other position within the scheduling interval and may be repeated. As will be explained shortly the upstream signalling block 62 provides a portion of the scheduling interval which delivers messages associated with MAC layer messages for requesting and allocating resources on the upstream.

Figure 6:
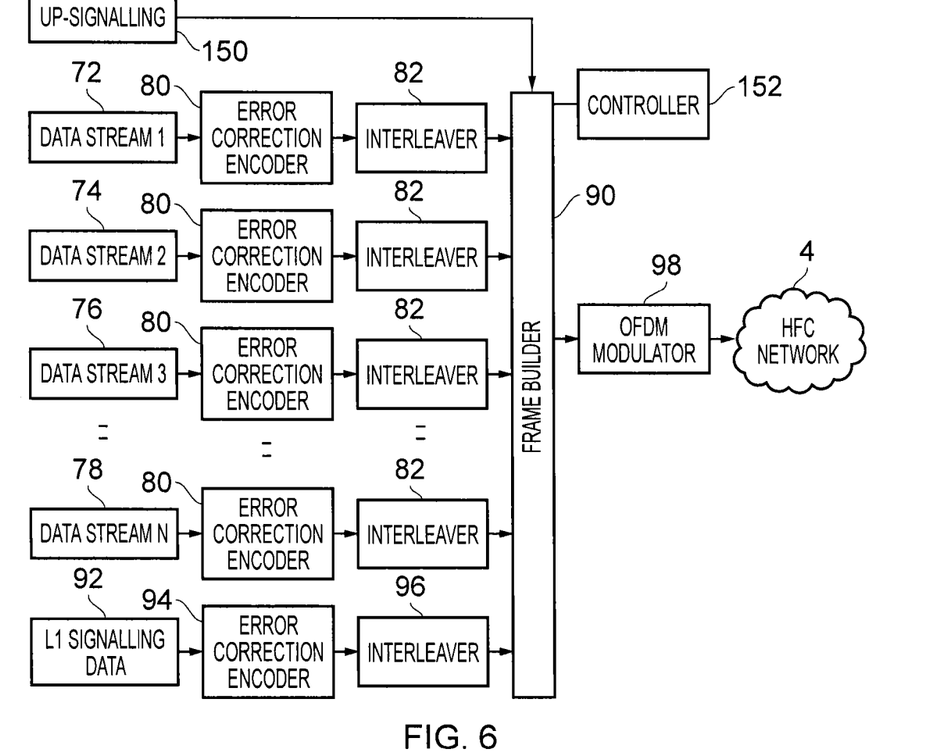
FIG. 6 is a schematic block diagram illustrating a transmitter according to the present technique.

A transmitter for generating the transmission frame shown in FIG. 5 is presented in FIG. 6. As shown in FIG. 6 each of the data streams which is delivering data for transmission corresponds to one of the data slices shown in FIG. 5. Thus as shown in FIG. 6 each of the data streams 72, 74, 76, 78 is generating data for transmission via the cable network system and corresponds to one of the data slices shown in FIG. 5. For each of the data streams an error correction encoder 80 is provided for encoding the data to be transmitted in accordance with an appropriate error correction code. An interleaver 82 then performs interleaving of the data in the time domain before feeding the encoded data to a frame builder 90. A lower branch of the transmitter provides signalling data, which could include, for example, the layer one signalling data from a block 92 which is error correction encoded with an error correction encoder 94 before being time interleaved by an interleaver 96 and fed to the frame builder 90. The frame builder 90 forms the scheduling interval of data such as those that are shown in FIG. 5. The scheduling interval of data is then converted into the frequency domain by an inverse fast fourier transform, a cyclic prefix is added, and the signal is then converted to an analog format using a digital to analog converter and finally frequency converted to the required transmission frequency by an RF modulator. For simplicity these operations are represented by the operation of an OFDM modulator 98 and transmitted via the cable network as explained with reference to FIGS. 1 and 2. Therefore, as shown in FIG. 6 the OFDM modulator 98 modulates the data slices as well as the signalling data on OFDM symbols which are modulated in the frequency domain and transformed into the time domain using the inverse FFT transformer 100.

Figure 7:
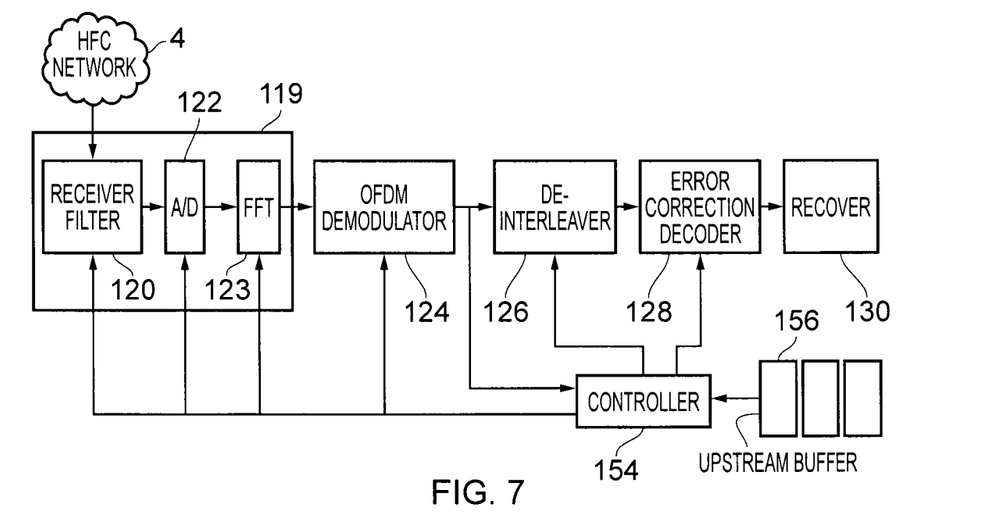
FIG. 7 is a schematic block diagram showing a receiver operating in accordance with the present technique.

At a receiver in a CM 6 the transmitted data for one or more of the data slices is detected and recovered. An example block diagram of a receiver is shown in FIG. 7. In FIG. 7 a receiving section 119 includes a receiver filter 120, an analogue to digital converter 122 and a Fast Fourier Transformer 123. The receiver filter 120 receives signals from the cable network 4 and passes the received signals to the analogue to digital converter 122. The digital domain data is then transformed from the time domain into the frequency domain by the Fast Fourier Transformer 123 and demodulated using an OFDM demodulator 124. Data from one or more of the data slices can be detected and recovered in accordance with the layer one signalling information, which is also received before the data slices from the signalling blocks from the downstream signal. The data is then de-interleaved by a de-interleaver 126 and decoded using an error correction decoder 128 before being fed to an interface 130 for communicating to a personal computer for example as shown in FIG. 2.

As shown in FIG. 7 a controller 154 is provided to control the OFDM demodulator 124, the de-interleaver 128 and the error correction decoder 128 to detect the layer one data and then use the layer one data to detect and recover the data from one or more of the data slices. Thus the receiver is arranged to first recover the layer one data from the layer one data blocks 50 in order to tune the receiver filter 120 to the data slice in which the data for a particular channel is to be recovered.

As shown in FIG. 6 a transmitter includes upstream signalling associated with an exchange of media access control (MAC) layer messages for requesting and granting access to transmit data on the upstream communications resources. An upstream signalling block 150 is shown to feed upstream signalling data to the scheduling interval builder 90 but may also include error correction encoders and an interleaver as shown for the other data streams. A controller 152 therefore controls the frame builder to include a burst of upstream signalling data for example in the blocks 62 shown in FIG. 5. In the receiver the controller 154 receives the layer one signalling data from the layer L1 blocks 50 and controls the receiver including the receiver filter 120, the OFDM demodulator, the deinterleaver 126 and error correction decoder 128 to recover the layer one data from the L1 block 50 in order to detect and recover data from a data slice. Furthermore, the controller 154 is arranged to request and receive grant of access to the upstream communications resources.

The request for upstream communications resources is dependent on a demand for those resources such as the presence of data in an upstream buffer 156. Thus in operation the controller 154 detects the presence of upstream data in the buffer 156 and transmits to the CMTS a request for access to the upstream resources when the CMTS signals an opportunity to do so by sending a MAC message downstream. The upstream signalling 150 is therefore provided to communicate messages granting access to the upstream communications resources and an allocation of those resources to the receiver shown in FIG. 7 which therefore forms part of the cable modem 6.

Figure 8:
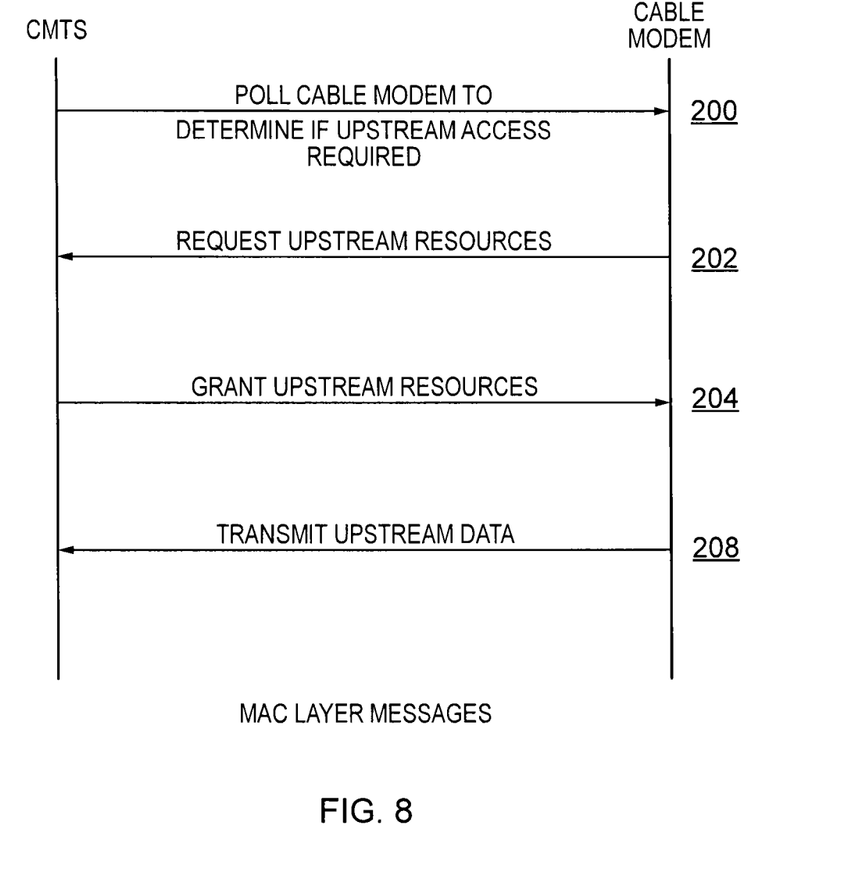
FIG. 8 is a flow diagram illustrating an exchange in messages between a CMTS and CM on a media access control (MAC) layer.

An arrangement of MAC layer messages which may be used to request and grant upstream communications resources to a CM 6 is shown in FIG. 8. In a first message 200 the upstream signalling message polls one or more of the CMs 6 to determine if access to upstream communications resources is required. The CMs 6 then respond with a message 202 which requests upstream resources. In a downstream message 204 the CMTS grants upstream resources in an upstream signalling message 150, for example, that shown in FIG. 6. The CM then transmits the upstream data 208 to the CMTS 1.

There can be various reasons for communicating upstream data depending on the application running on the user device connected to the CM.

Figure 9:
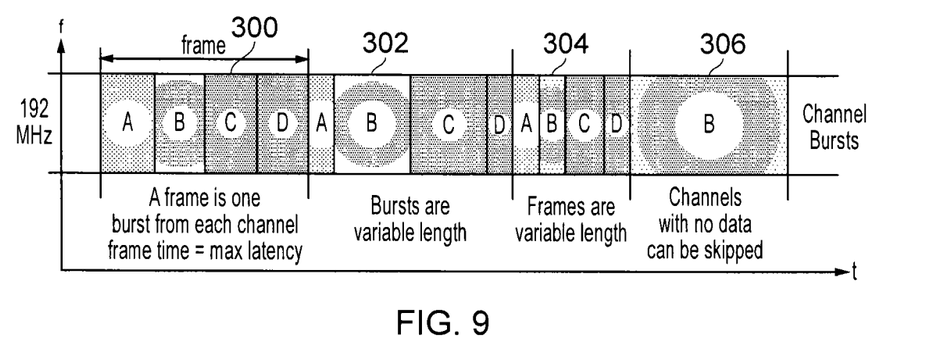
FIG. 9 is a schematic illustration of a downstream signal generated by a transmitter from the CMTS to the CM according to one example using time-slicing.

FIG. 9 provides a further illustration of a frame structure corresponding to that shown in FIG. 5, although FIG. 5 shows only a single scheduling interval. FIG. 9 includes a further enhancement in which transmission scheduling intervals are divided into sections each of which corresponds to a burst transmission to be applied to one of a different set of receiver CMs. The sets of CMs are divided in accordance with the ability of the CM receiver to detect and recover the data from the downstream and/or an environment in which the CM is operating to detect and recover the downstream data. As will be appreciated it is desirable to use the most spectrally efficient modulation schemes in order to increase an efficiency with which data is communicated via a cable network. For example, it is desirable to use modulation schemes with a very high constellation number such as 4096 QAM. Having regard to a relatively benign environment for communicating signals via a cable network providing very high signal to noise ratios, it is possible to use such spectrally efficient modulation schemes. However, the reception environment varies depending on, for example, how close a receiver is to the CMTS or head end. If the receiver is very close then the very high signal to noise ratios can be obtained and therefore highly spectrally efficient modulation schemes can be used. If however the receiver is some distance from the CMTS then a reception environment may be harsh in which case it will not be possible to use very highly spectrally efficient modulation schemes because the signal to noise ratio may not be high enough. Accordingly, for such receivers it will appropriate to use a different modulation scheme, possibly reducing the rate of error correction encoding by increasing an amount of redundancy of the code. As such, it has been proposed to divide the receivers into different categories and use different transmission parameters, for example, modulation schemes, encoding rates and transmission power etc. in accordance with a profile of the receivers. Accordingly, the scheduling interval shown in FIG. 9 is divided into four possible profiles A, B, C, D.

As may be understood from the example embodiments, profile is a term which may be used to convey a list of modulations for each sub-carrier in an OFDM channel, and a slice is a fraction of the downstream OFDM channel which has a specific membership group of CMs.

In a first scheduling interval 300 the profiles are divided equally in time between the four possible categories A, B, C, D. In a second scheduling interval 302 category A receives a relatively small allocation as well as category D and the remainder is divided into categories B and C. A different arrangement is shown in the third scheduling interval 304 and the final scheduling interval provides an allocation to only to file B. Accordingly, an allocation of communications resources within a scheduling interval or between scheduling intervals is provided in correspondence with an ability of the receivers to receive data being communicated. The data transmitted in each profile A, B, C, D may be the same payload data in, for example, a transmission environment which is broadcasting data to all CM's such as television broadcast data or each profile may be transmitted different data.

Figure 10:
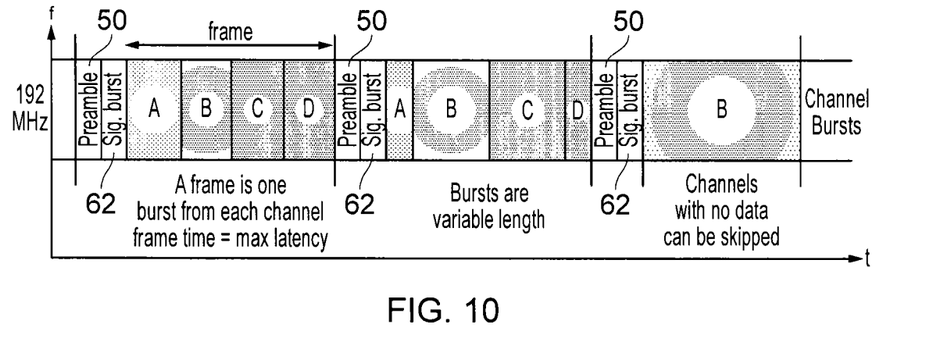
FIG. 10 is a schematic illustration showing an arrangement of a a downstream signal using time-slicing between the data profiles in accordance with the present technique.

FIG. 10 provides an illustration of a downstream signal showing for example three scheduling intervals in accordance with the present technique. In the downstream signal shown in FIG. 10, which corresponds substantially to that shown in FIG. 9, each scheduling interval includes a preamble followed by a MAC signalling resource providing the upstream signalling. Thus in each scheduling interval is shown a preamble block 50 at the start of the scheduling interval as it is shown in FIG. 5. The preamble is followed by a separate MAC signal 62 providing on a downstream transmission, signalling for the allocation of communications resources on the upstream. Thus as illustrated in FIG. 8, the upstream signalling burst 62 may provide either the polling messages for each of the CM's to determine if access to upstream resources is required 200 or a grant of upstream resources in a message 204.

According to present technique, the separate MAC signals 62 carry MAC layer information for the upstream transmission as already explained. However, the timing of the preamble symbols 50 and the upstream signalling burst 62 are independent of each other. Thus although the preamble symbols 50 occur at the start of each scheduling interval, the upstream signalling burst 62 could occur at any part of the scheduling interval. In one example, one or more OFDM symbols or one or more cells within an OFDM symbol contain the MAC layer messages which are sent regularly at intervals to support the request and grant cycle of the CM and CMTS. The upstream signalling burst could occur frequently within a scheduling interval or between scheduling intervals in order to reduce a round trip delay for requesting and granting access to the upstream communications resources. According to the present technique therefore the preamble physical layer signalling and the MAC upstream signalling in the upstream burst 62 are decoupled from one another. As will be appreciated therefore, the timing of the preambles, MAC bursts and profile data are all independent of one another so that signalling overhead is optimised and data is transmitted as efficiently as possible. In some example the MAC signalling could be in line with the data profile, so that each data profile has its own MAC signalling burst.

Figure 11:
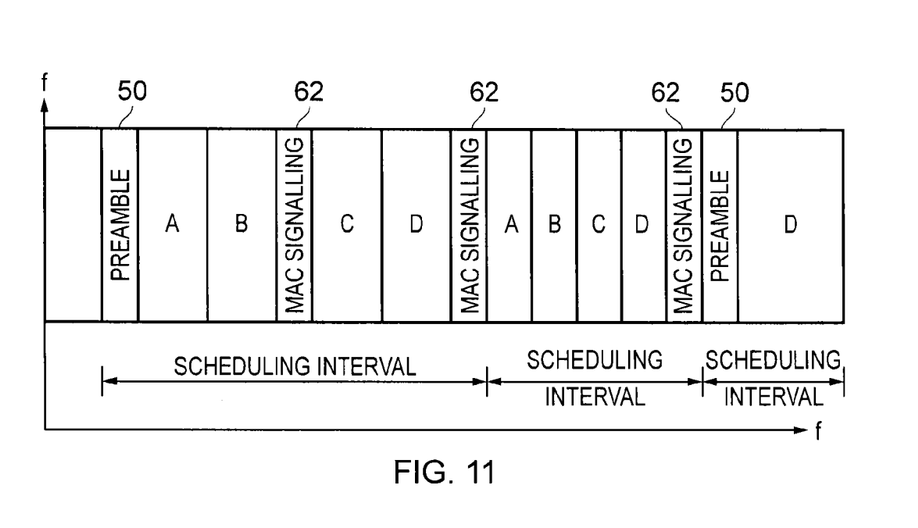
FIG. 11 is a schematic illustration showing another example arrangement of a a downstream signal using time-slicing of between the data profiles in accordance with the present technique.
Figure 12:
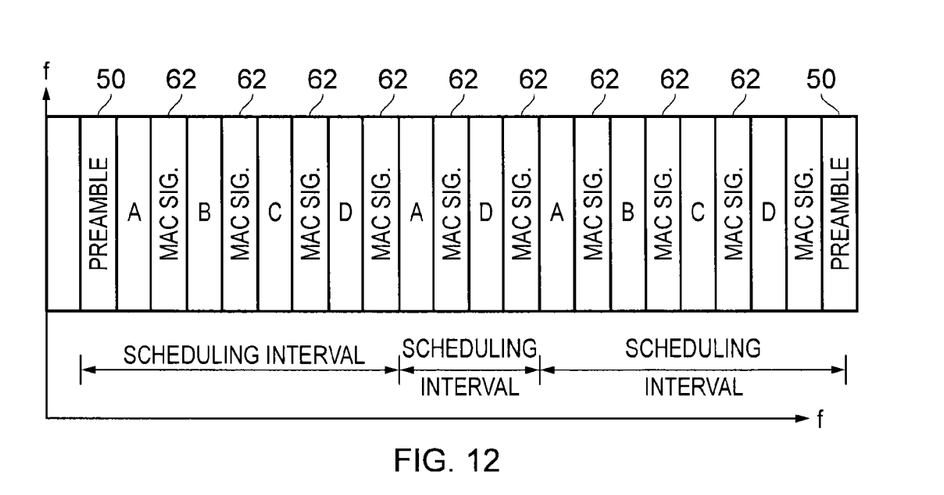
FIG. 12 is a schematic illustration showing another example arrangement of a a downstream signal using time-slicing of between the data profiles in accordance with the present technique.

Further examples of a transmission scheduling interval generated in accordance with the present technique are shown in FIGS. 11 and 12. The transmission scheduling intervals of FIGS. 11 and 12 illustrate that the MAC signalling resource may be interleaved with the data profiles and may be distributed throughout the scheduling interval. The MAC signals may occur more than once in a scheduling interval or alternatively once every few scheduling intervals and the capacity can be adjusted in accordance with a number of CMs connected to the cable network and a capacity of up-stream signalling required. A location of the up-stream signalling bursts 62 may be signalled by the L1 signalling bursts 50 in the preamble of a current scheduling interval for the next scheduling interval.

Referring to FIG. 11 a time slice structure is illustrated for transmitting data according to different profiles A, B, C, D in which three scheduling intervals are shown. Each scheduling interval provides a round robin arrangement for transmitting data according to one or more of the data profiles which are scheduled to receive downlink transmissions for the scheduling intervals. However it will be noted that the preamble does not need to be transmitted for each scheduling interval so that in fact the preamble may be transmitted infrequently and not in association with the scheduling interval. According to the example shown in FIG. 10, the scheduling interval includes one or more MAC signalling burst 62. The number of MAC signalling bursts 62 and their frequency with respect to the scheduling interval is determined independent upon a requirement for communicating MAC layer messages for requesting and granting upstream resources to the various receivers according to each of the data profiles A, B, C, D.

FIG. 12 provides a similar illustration to the examples shown in FIG. 11 except that a MAC signalling burst 62 is provided for each of the data profiles A, B, C, D. As such in this example each data profile is provided with its own MAC signalling burst for communicating MAC layer messages to receivers associated with the data profile.

In a further example, rather than communicating data for each of the different data profiles in accordance with a time slicing of downstream communicates resources, data may be transmitted on the downstream to each of the data profiles by slicing the communications resources in frequency.

Figure 13:
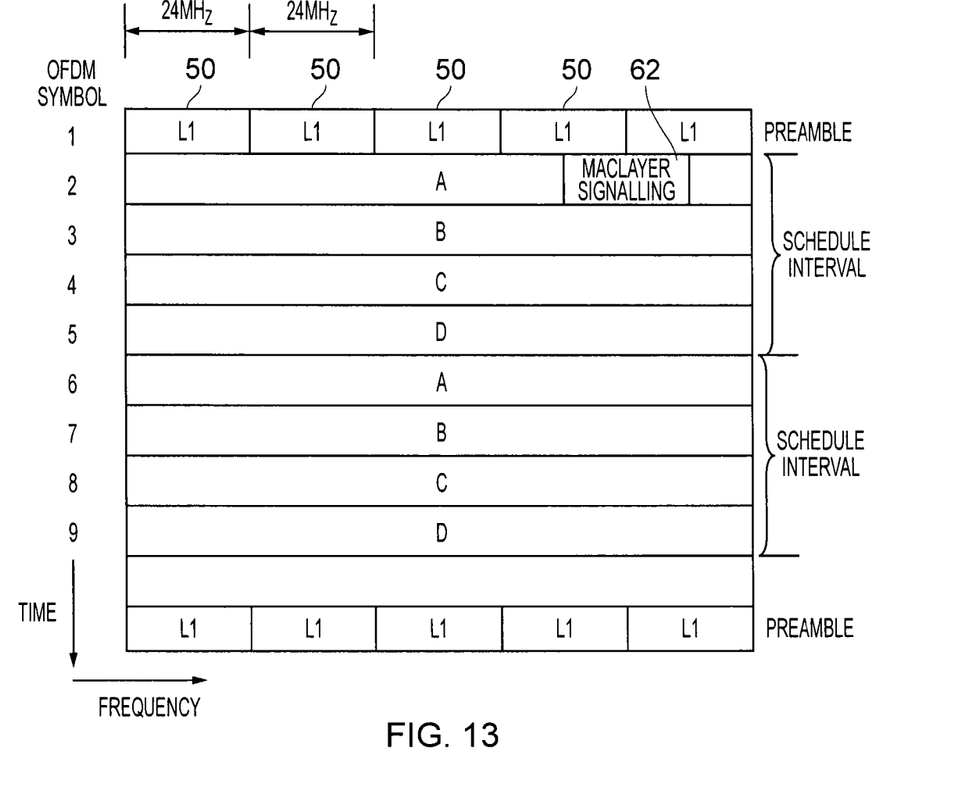
FIG. 13 is an illustrative representation showing a make-up of downstream communication scheduling interval using orthogonal frequency division multiplexed (OFDM) symbols for each of a plurality of data profiles A, B, C, D.

FIG. 13 corresponds substantially to FIG. 5 except that the scheduling intervals for the frequency slicing are shown for each data profile having a dedicated OFDM symbol. However, the example shown in FIG. 13 illustrates a disadvantage of the time slicing because data transmitted to a particular profile may not fit into a complete number OFDM symbols. Accordingly, in another embodiment frequency slicing is used to divide up downstream communications resources between each of the different data profiles. A detailed example of frequency slicing is shown in FIG. 14.

Figure 14:
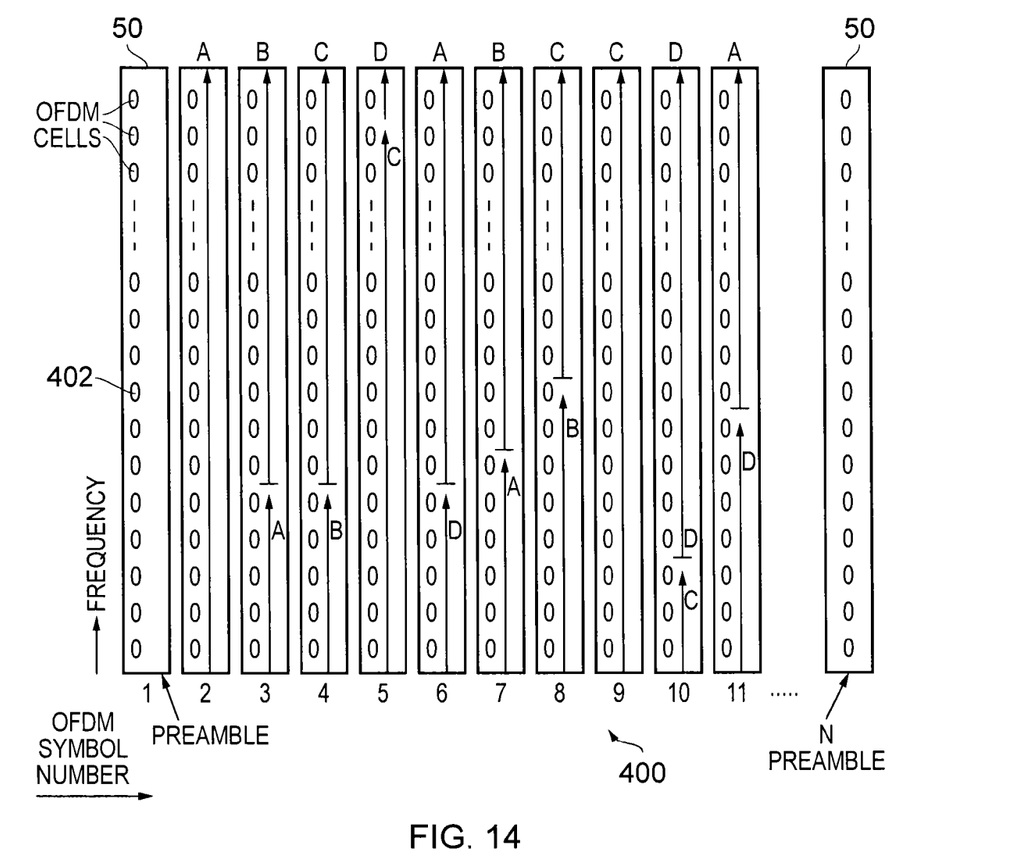
FIG. 14 is a schematic illustration showing example arrangement of a downstream signal using frequency-slicing of between the data profiles in accordance with the present technique.
Figure 15:
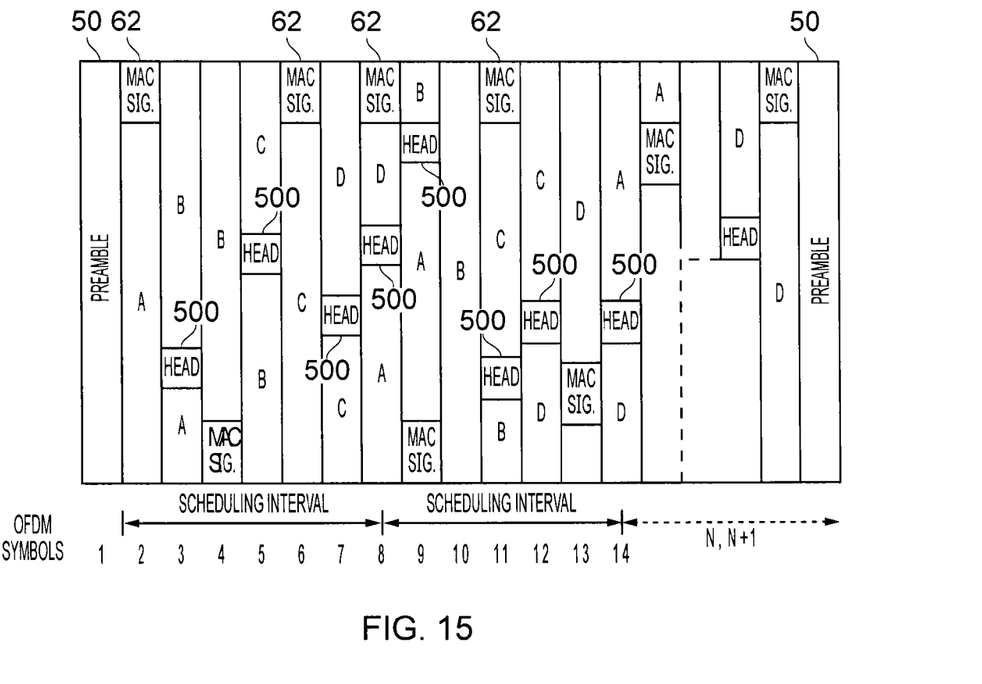
FIG. 15 is a schematic illustration of a downstream signal formed using frequency-slicing between a plurality of data profiles A, B, C, D.

In FIG. 14 a plurality of OFDM symbols 400 are shown with frequency on a vertical axis and time on the horizontal axis. As shown in FIG. 14, each of the OFDM symbols 400 includes a plurality of OFDM cells which represent subcarriers carrying data on the OFDM symbol as well as pilot symbols. The OFDM symbols also include marker or header symbols which mark the start of a slice. Thus as shown in FIG. 14 each of the data slices A, B, C and D are allocated subcarriers on successive OFDM symbols such that the resources are sliced and allocated to each data profile by frequency. Thus, for example, slice A starts from OFDM symbol 2 and continues to OFDM symbol 3 and is separated by two header subcarriers 404 after which the following OFDM symbols are allocated to slice B which continues to OFDM symbol 4. The diagram shown in FIG. 14 is reproduced in FIG. 15 which illustrates, in perhaps a clearer form, the allocation of the frequency slices to each of the data profiles. Also shown in FIG. 15 is the preamble OFDM symbol 50 which occurs relatively infrequently and not associated with the scheduling interval. Each of the data profiles is separated in the frequency domain by a header 500 which may in one example be a forward error correction (FEC) header.

Figure 16:
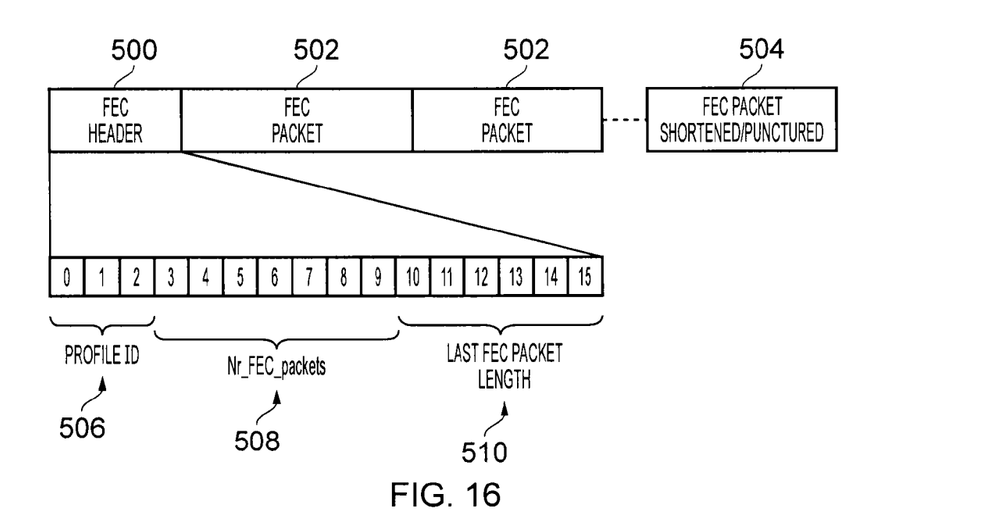
FIG. 16 is a schematic illustration of a payload data for a profile encoded as a plurality of forward error correction (FEC) packets and including an FEC header.

Thus embodiments of the present technique provide an arrangement in which the data in the form of packets is divided into forward error correction (FEC) packets by dividing the data into data blocks and encoding the data into separate FEC packets which are shown in FIG. 16.

In FIG. 16 an FEC header 500 heads a plurality of FEC packets 502 which are terminated with a final FEC packet 504 which may be shortened or punctured in order to fit into an available allocation of communications resources on the downstream. The FEC header 500 includes data, for example, 16 bits which is divided into a profile ID 506, a number of FEC packets in the data profile slice 508 and a last FEC packet length 510. Thus with each of the data profiles A, B, C, D the FEC header 500 and FEC packets 502 are mapped onto the subcarriers of the OFDM symbols in the frequency domain as shown in FIG. 15.

In accordance with the present technique, each of the data profiles includes in the frequency domain a MAC signalling burst or block 62 as previously explained. However, rather than occupying a separate time portion, the MAC signalling block 62 forms part of the frequency slice allocated to each of the different data profiles A, B, C, D. Thus in this example each profile is allocated separate resources for MAC signalling for communicating MAC messages to receivers associated with the profile.

Figure 17:
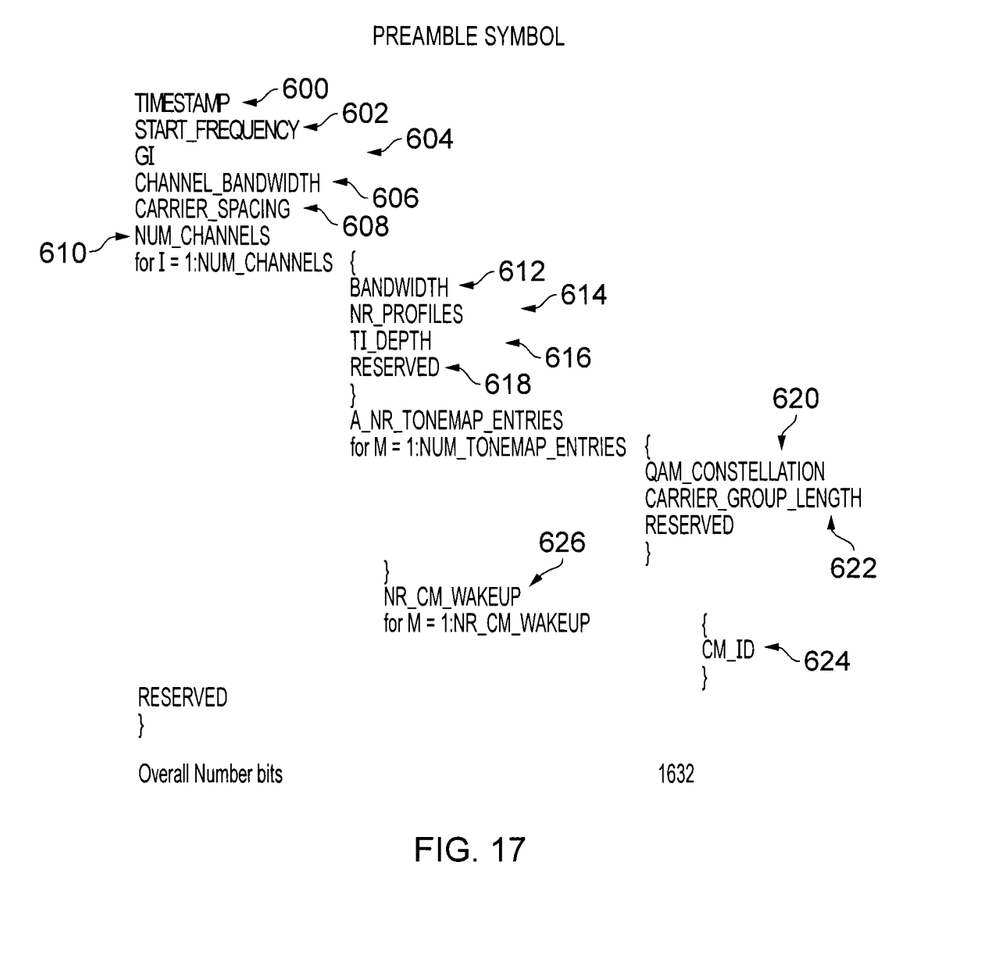
FIG. 17 is a representation of data forming physical layer data of a preamble symbol.

FIG. 17 provides an illustration of parameters which may be included in the preamble symbol carrying the layer 1 block 50. The preamble symbol may include a time stamp 600 indicating a time at which the preamble symbol is transmitted, a start frequency 602, a guard interval duration 604, a channel band width 606, a spacing between subcarriers 608 and a number of channels 610. For each of the number of frequency channels, an indication is given of the bandwidth 612, a number of profiles within the channel 614, a time interval depth 616 and a reserved field 618. For each of the channels a number of tones is indicated providing a modulation consultation 620, a carrier group length 622 as well as a wake up flag 624 for each of a number of CMs which should be activated in a field 626.

In some embodiments the profiles for the transmission of data may occupy substantially the entire bandwidth available from the cable network. The upstream signalling may be interleaved with each of the downstream data transmissions for each of the different data profiles. The upstream signalling bursts could be transmitted in a few OFDM cells. Each of the upstream signalling bursts may contain signalling information for all of the profiles in the scheduling interval.

Embodiments of the present technique can therefore provide a receiver for receiving payload data and for responding to upstream MAC layer message to transmit data on the upstream using upstream communications resources allocated by the upstream messages. In one example the upstream signalling bursts in the scheduling interval provide the MAC layer messages for each of the one or more data profiles and the controller is configured to detect the data profile for the receiver and to detect and recover the upstream signalling messages from the upstream signalling burst for the data profile of the receiver.

Various further aspects and features of the present invention are defined in the appended claims. Various modifications may be made to the embodiments hereinbefore described. For example although the embodiments described above have been made with reference to a DOCSIS standard, it will be appreciated that embodiments of the present technique are equally applicable to other cable networks and communications systems.

The invention claimed is:

1. A communications apparatus for receiving payload data transmitted on a downstream using Orthogonal Frequency Division Multiplexed (OFDM) symbols via a cable network, the communications apparatus comprising:
   a receiver comprising a receiver filter, an analogue to digital converter, and a Fast Fourier Transformer, the receiver being configured to receive a downstream signal representing the payload data modulated onto one or more OFDM symbols, the downstream signal comprising
      one or more data profiles transmitted in scheduling intervals, each of the one or more data profiles providing the payload data according to a different receiver profile and being carried by different downstream communications resources of the OFDM symbols within the scheduling intervals, and
      physical layer signalling data identifying the downstream communications resources of the data profiles in each of the scheduling intervals; and
   a demodulator configured to demodulate the OFDM symbols of one of the data profiles to detect and to recover the payload data using the physical layer signalling data, wherein the physical layer signalling data is received as a preamble of one of the scheduling intervals,
   wherein the receiver and the demodulator are further configured to receive one or more of the scheduling intervals, which include in separate communications resources of the downstream signal a media access control (MAC) signal representing upstream messages relating to the transmission of data from the receiver to a transmitter.

2. The communications apparatus according to claim 1, further comprising a controller configured to respond to the upstream messages and to transmit data on an upstream channel of the cable network in response to a grant of upstream communications resources provided by the upstream messages.

3. The communications apparatus according to claim 2, wherein the MAC signal provides at least one MAC signalling message relating to the request and the grant of the upstream communications resources.

4. The communications apparatus according to claim 1, wherein the received signal includes in one or more of the scheduling intervals a plurality of MAC signals to provide the receiver with a reduction in time to request and to grant access to upstream communications resources.

5. The communications apparatus according to claim 2, wherein each of the scheduling intervals includes a plurality of MAC signals, which are interleaved with the payload data of each of the data profiles.

6. The communications apparatus according to claim 5, wherein the MAC signals in the scheduling interval provide medium access control messages for each of the one or more data profiles, and the controller is further configured to detect the data profile for the receiver and to detect and recover the upstream signalling messages from the MAC signals for the data profile of the receiver.

7. The communications apparatus according to claim 5, wherein the physical layer signalling data provides an indication of a location of each of the one or more data profiles in the time and frequency communications resources within each scheduling interval, and a location of one or more of the MAC signals, and the controller is further configured to detect and to recover the payload data and the MAC signals for the receiver using the physical layer signalling data, and to detect and to recover the upstream messages using the physical layer signalling data.

8. The communications apparatus according to claim 5, wherein an allocation of downstream communications resources to the MAC signals is decoupled from the allocation of downstream communications resources to the preamble physical layer signalling.

9. The communications apparatus according to claim 1, wherein the receiver comprises a cable modem configured to communicate the payload data in data packets via the cable network.

10. A communications apparatus for transmitting payload data on a downstream using Orthogonal Frequency Division Multiplexed (OFDM) symbols via a cable network, the communications apparatus comprising:

a transmitter comprising a frame builder and a digital to analogue converter, the transmitter being configured to receive the payload data to be transmitted and to receive physical layer signalling data for use in detecting and recovering the payload data at one or more receivers, and to form the payload data and the physical layer signalling data into scheduling intervals for transmission, the physical layer signalling data forming a preamble to at least one of the scheduling intervals and the payload data being formed into one or more data profiles, each of the one or more data profiles providing the payload data according to a different receiver profile and being carried by different downstream communications resources of the OFDM symbols within the scheduling intervals; and a modulator configured to modulate one or more OFDM symbols with the payload data and the physical layer signalling data, wherein the transmitter and the modulator are further configured to transmit the one or more OFDM symbols, wherein the transmitted OFDM symbols are formed so that the preamble to the at least one of the scheduling intervals provides the physical layer signalling data, and one or more of the scheduling intervals includes in separate communications resources of the downstream signal a media access control (MAC) signal representing upstream messages relating to the transmission of data from the one or more receivers to the transmitter.

11. The communications apparatus according to claim 10, wherein the modulator and the transmitter are further configured to transmit the one or more of the scheduling intervals with a plurality of MAC signals to provide the one or more receivers with a reduction in time to request and to grant access to upstream communications resources.

12. The communications apparatus according to claim 11, wherein the MAC signals represent at least one medium access control layer signalling message relating to a request and grant of upstream communications resources.

13. The communications apparatus according to claim 11, wherein the MAC signals provide medium access control messages for the one or more receivers for one or more of the profiles in the scheduling intervals.

14. The communications apparatus according to claim 11, wherein the physical layer signalling data provides an indication of temporal location of each of the one or more data profiles within each of the scheduling intervals, and a location of one or more of the MAC signals.

15. The communications apparatus according to claim 11, wherein one or more of the MAC signals transmitted in each scheduling interval are modulated onto one or more OFDM symbols or one or more cells of an OFDM symbol.

16. The communications apparatus according to claim 11, wherein an allocation of downstream communications resources to the MAC signals is decoupled from the allocation of downstream communications resources to the preamble physical layer signalling.

17. The communications apparatus according to claim 10, wherein each of the scheduling intervals includes a plurality of MAC signals, which are interleaved with the payload data of each of the data profiles.

18. The communications apparatus according to claim 17, wherein the the modulator and the transmitter are further configured to transmit the MAC signals in the scheduling intervals providing medium access control messages for each of the one or more data profiles.

19. The communications apparatus according to claim 10, wherein the payload data is transmitted for said each of the one or more data profiles using all frequencies available within a predetermined bandwidth for downstream transmission on the cable network.

20. A method of transmitting payload data on a downstream using Orthogonal Frequency Division Multiplexed (OFDM) symbols via a cable network, comprising:

receiving the payload data to be transmitted and receiving physical layer signalling data, using circuitry, for use in detecting and recovering the payload data at a receiver;

forming, using the circuitry, the payload data and the physical layer signalling data into scheduling intervals for transmission, the physical layer signalling data forming a preamble to at least one of the scheduling intervals and the payload data being formed into one or more profiles, each of the one or more profiles providing the payload data according to a different receiver profile and forming a different temporal part within each of the scheduling intervals, and being carried by different downstream communications resources of the OFDM symbols within the scheduling intervals;

modulating, using the circuitry, one or more OFDM symbols with the payload data and the signalling data; and transmitting the one or more OFDM symbols, using the circuitry, wherein the transmitting includes transmitting the transmitted one or more OFDM symbols so that the preamble to the at least one of the scheduling intervals provides the physical layer signalling data, and one or more of the scheduling intervals includes in separate communications resources of the downstream signal a media access control (MAC) signal representing upstream messages relating to the transmission of data from the receiver to a transmitter.

* * * * *